United States Patent
Merrill et al.

(10) Patent No.: US 8,102,145 B2
(45) Date of Patent: Jan. 24, 2012

(54) INTERNAL PACKAGED ALTERNATOR WITH MICROPROCESSOR CONTROLLED MULTI-INPUT REGULATOR

(75) Inventors: Thomas A. Merrill, Noblesville, IN (US); Jack D. Harmon, Carmel, IN (US); Mingshe Zhou, Fishers, IN (US)

(73) Assignee: Remy Technologies LLC, Pendleton, IN (US)

( * ) Notice: Subject to any disclaimer, the term of this patent is extended or adjusted under 35 U.S.C. 154(b) by 679 days.

(21) Appl. No.: 12/146,669

(22) Filed: Jun. 26, 2008

(65) Prior Publication Data

US 2009/0322288 A1    Dec. 31, 2009

(51) Int. Cl.
*H02J 7/14*    (2006.01)
*H02J 7/00*    (2006.01)
*H02P 9/30*    (2006.01)

(52) U.S. Cl. ............ 320/104; 320/160; 322/23
(58) Field of Classification Search .......... 320/104, 320/160; 322/23
See application file for complete search history.

(56) References Cited

U.S. PATENT DOCUMENTS

| | | | |
|---|---|---|---|
| 4,659,977 A | 4/1987 | Kissel et al. | |
| 5,216,350 A | 6/1993 | Judge et al. | |
| 5,402,007 A * | 3/1995 | Center et al. | 290/40 B |
| 5,929,613 A * | 7/1999 | Tsuchiya et al. | 322/58 |
| 6,081,084 A * | 6/2000 | Crecelius | 318/400.35 |
| 6,163,138 A | 12/2000 | Kohl et al. | |
| 6,166,523 A | 12/2000 | Singh et al. | |
| 6,424,157 B1 * | 7/2002 | Gollomp et al. | 324/430 |
| 6,515,456 B1 * | 2/2003 | Mixon | 320/160 |
| 7,026,794 B1 | 4/2006 | French et al. | |
| 7,245,111 B2 | 7/2007 | Montgomery, Jr. et al. | |
| 7,283,899 B1 | 10/2007 | Harmon et al. | |
| 2004/0008031 A1 * | 1/2004 | Arai et al. | 324/429 |
| 2008/0096713 A1 * | 4/2008 | Beson | 475/16 |

* cited by examiner

*Primary Examiner* — M'Baye Diao
(74) *Attorney, Agent, or Firm* — Maginot, Moore & Beck

(57) ABSTRACT

A vehicle alternator comprises a housing with a voltage regulator positioned within the housing. The alternator further comprises a rotor having a field coil positioned within the housing and a stator positioned within the housing. The stator includes stator windings configured to provide an output voltage in response to rotation of the rotor. The voltage regulator is configured to receive a battery temperature signal from outside of the alternator and control the current provided to the field coil based at least in part on the received battery temperature signal. In at least one embodiment, the battery temperature signal is provided from a temperature sensor positioned adjacent to the vehicle battery. The voltage regulator of the alternator includes a processor configured to control the current provided to the field coil based at least in part on the particular type of vehicle battery used in association with the alternator.

20 Claims, 2 Drawing Sheets

INTERNAL PACKAGED ALTERNATOR WITH MICROPROCESSOR CONTROLLED MULTI-INPUT REGULATOR

FIELD

This application relates to the field of vehicle electric systems and more particularly, to arrangements and methods for controlling a vehicle alternator.

BACKGROUND

Alternators are used to convert mechanical energy from a vehicle engine into electrical energy for the vehicle. The electrical energy produced by the alternator is used to charge the vehicle battery, and may also be used to power electric loads on the vehicle.

The alternator generally includes a rotatable field coil positioned within a stator having a plurality of stator windings. Operation of the engine results in rotation of the field coil. Current flowing through the rotating field coil results in a related current induced in the stator windings. Current flowing through the stator windings provides an output voltage that is rectified and delivered to the vehicle battery and/or electric loads on the vehicle.

Modern vehicle alternators include a regulator that controls the current through the field coil. When more current is provided to the field coil, the output of the alternator increases. When less current is provided to the field coil, the output of the alternator decreases.

Various types of rechargeable batteries are used in modern vehicle electrical systems. Some of these batteries require specific controls to avoid damage to the battery. For example, in many modern "no idle" systems in the heavy duty truck market, an AGM battery is used. An AGM battery must be charged within a specific current range to avoid damage to the battery. Furthermore, this preferred current range for charging may change depending on the temperature of the battery and environmental conditions. Accordingly, while a first battery in one environment may have one preferred current range for charging, a second battery in a different environment will often have a very different preferred current range for charging.

In view of the foregoing, it would be desirable to provide an alternator including a regulator configured to adjust the current to the field winding depending at least in part on the type of battery used in the vehicle. It would also be desirable to provide an alternator including a regulator configured to adjust the current to the field winding depending at least in part on the conditions of the battery and/or environmental conditions in which the battery operates. While it would be desirable to provide an alternator that provides one or more of these or other advantageous features as may be apparent to those reviewing this disclosure, the teachings disclosed herein extend to those embodiments which fall within the scope of the appended claims, regardless of whether they accomplish one or more of the above-mentioned advantages.

SUMMARY

A vehicle alternator comprises a housing with a voltage regulator positioned within the housing. The alternator further comprises a rotor having a field coil positioned within the housing and a stator positioned within the housing. The stator includes stator windings configured to provide an output voltage in response to rotation of the rotor. The voltage regulator is configured to receive a battery temperature signal from outside of the alternator. The voltage regulator is also configured to control the current provided to the field coil based at least in part on the received battery temperature signal. In at least one embodiment, the battery temperature signal is provided from a temperature sensor positioned adjacent to the vehicle battery.

In at least one embodiment, the voltage regulator of the alternator includes a processor. The processor is configured to control the current provided to the field coil based at least in part on the particular type of vehicle battery used in association with the vehicle alternator. Accordingly, a memory device associated with the processor may include a plurality of different programs, with each of the plurality of different programs adapted for use with a particular type of battery. The processor executes one of the plurality of different programs, depending on the type of battery installed in a vehicle.

A method of controlling a vehicle alternator comprises delivering a battery temperature signal from outside the vehicle alternator to a regulator positioned within a housing of the vehicle alternator. The method further comprises providing a current to a field coil and adjusting the current provided to the field coil based at least in part on the battery temperature signal received by the regulator. In at least one embodiment, the method further comprises the step of executing a selected program using a processor in the regulator in order to adjust the current provided to the field coil, wherein the selected program is based at least in part on the type of battery used in association with the vehicle alternator.

The above described features and advantages, as well as others, will become more readily apparent to those of ordinary skill in the art by reference to the following detailed description and accompanying drawings.

DESCRIPTION OF EXEMPLARY EMBODIMENTS

Figure 1:
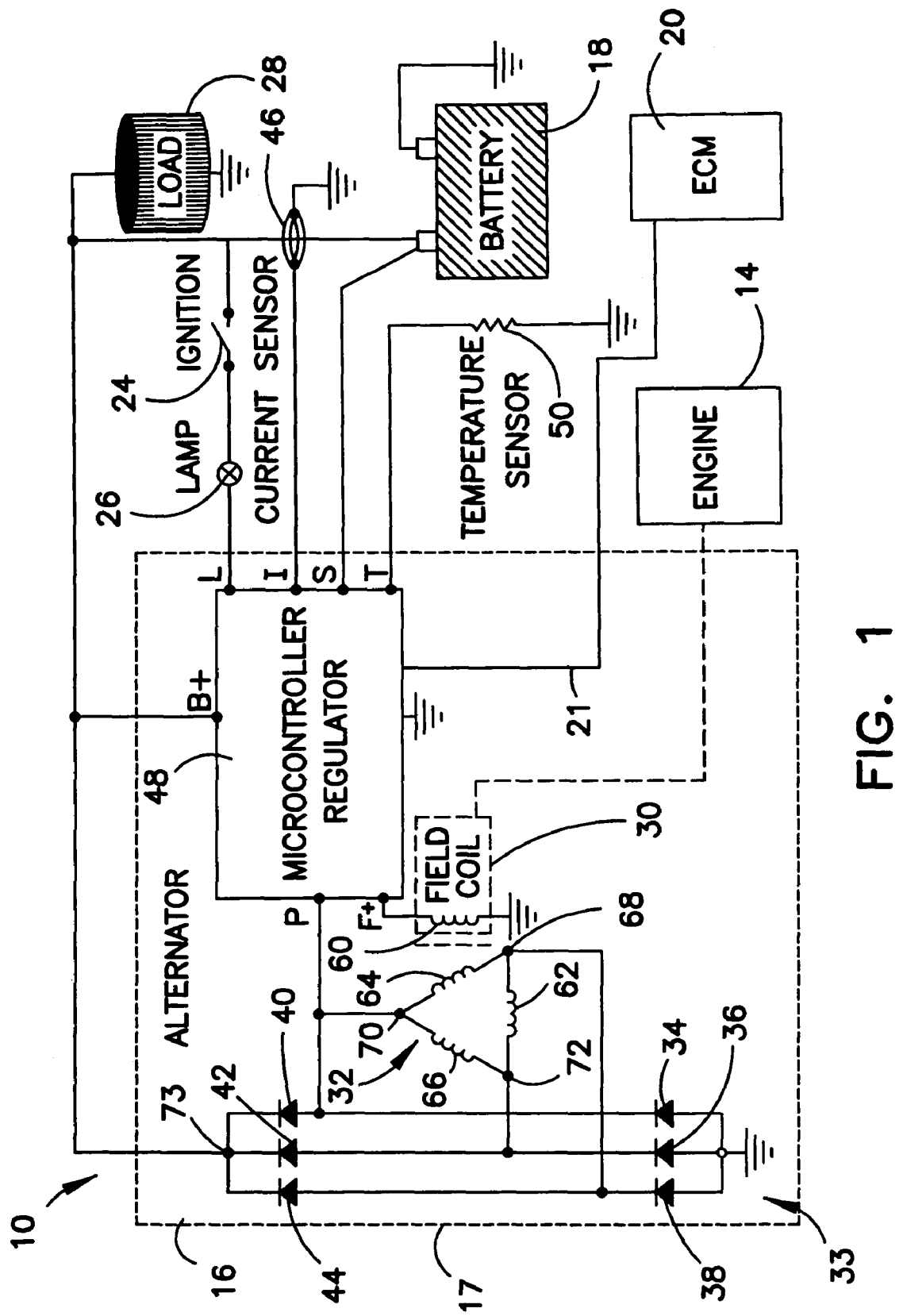
FIG. 1 is a block diagram of a vehicle having an engine, and an alternator in accordance with an exemplary embodiment.

Referring to FIG. 1, a vehicle 10 having a vehicle alternator 16 in accordance with an exemplary embodiment is illustrated. The vehicle 10 further includes an engine 14 and a battery 18.

The engine 14 is provided to output a drive torque for moving the vehicle 10. The engine 14 is operably coupled to a rotor 30 of the alternator 16. Operation of the engine 14 results in rotation of the rotor 30. In particular, when an ignition switch 24 is closed, electrical current from the battery 18 is delivered to a starter motor (not shown). When the starter motor is energized, it cranks the engine 14. When the engine fires, the rotor 30 spins and the alternator 16 generates an output current. The output current of the alternator 16 is utilized to electrically charge the battery 18 and is utilized by other electrical devices of the vehicle 10 as represented by the vehicle load 28.

With continued reference to FIG. 1, the alternator 16 includes the rotor 30, a stator 32, a rectifier 33, a current sensor 46, and a voltage regulator 48, all positioned within a housing 17. The housing 17 is typically a metal casing, such as a steel casing or a cast aluminum casing. However, it will be recognized that the housing 17 could also be comprised of any other suitable material.

The rotor 30 of the alternator 16 includes a field coil 60 that receives a signal from the regulator 48 having a predetermined duty cycle. The stator 32 is operably coupled around the rotor 30. The stator 32 generates an output current at node 73 having a magnitude that is based on the duty cycle of the signal applied to the field coil 60. The stator 32 includes phase coils 62, 64, 66 coupled in a Delta-configuration. In another exemplary embodiment, the phase coils 62, 64, 66 are coupled in a Y-configuration.

The stator 32 is electrically coupled to the rectifier 33, which delivers the alternator output at node 73. The rectifier 33 includes diodes 34, 36, 38, 40, 42, 44. In the embodiment of FIG. 1, the phase coil 64 is electrically coupled between a node 70 and a node 68. The phase coil 66 is electrically coupled between a node 70 and a node 72. The phase coil 62 is electrically coupled between the node 72 and the node 68. The diode 34 is electrically coupled between the node 70 and electrical ground, the diode 36 is electrically coupled between the node 72 and electrical ground, and the diode 38 is electrically coupled between node 68 and electrical ground. The diode 44 is electrically coupled between the node 68 and a node 73, the diode 42 is electrically coupled between the node 72 and the node 73, and the diode 40 is electrically coupled between the node 70 and the node 73.

Figure 2:
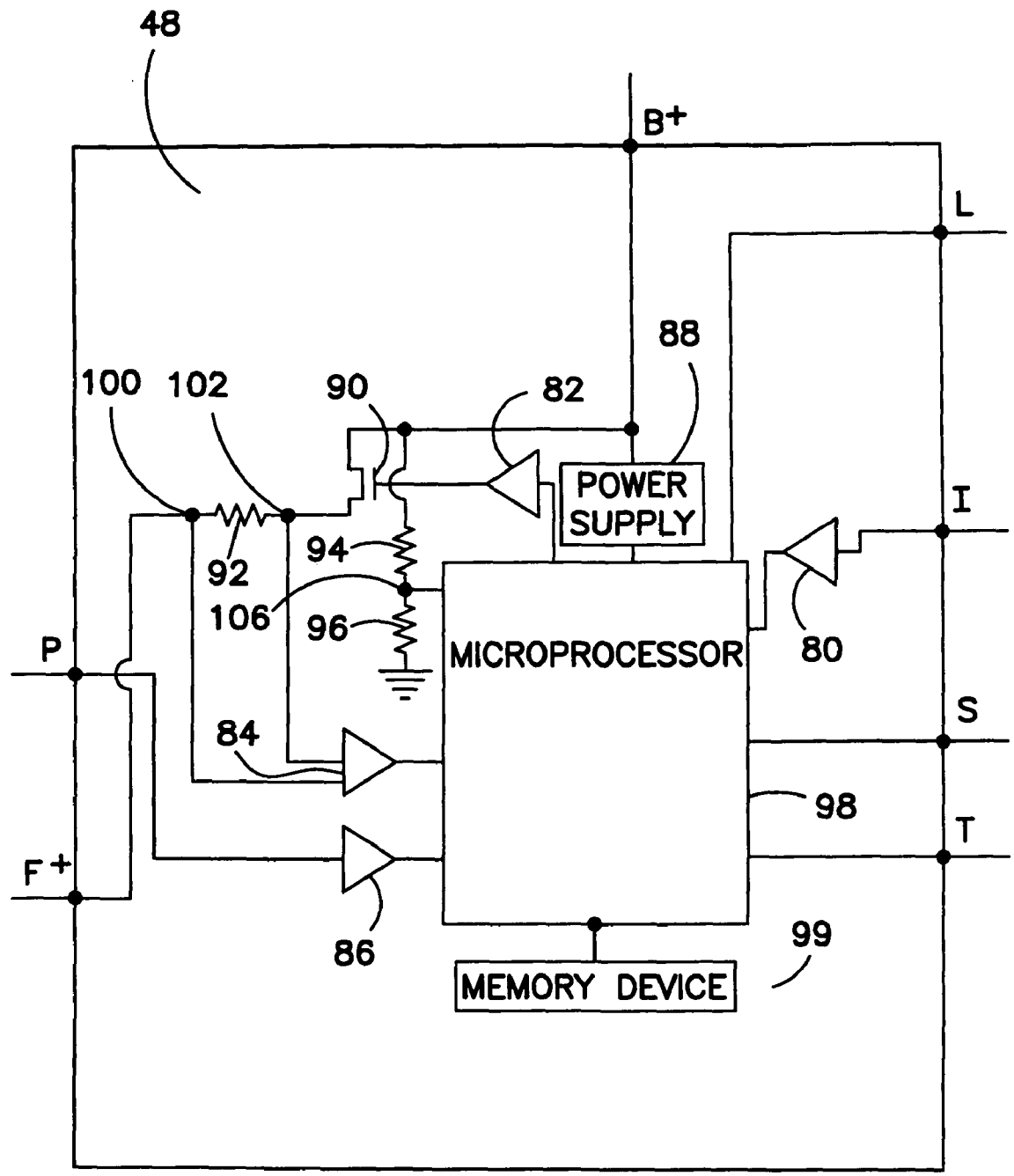
FIG. 2 is a block diagram of an internal regulator in the alternator of FIG. 1.

The current sensor 46 provides an output signal that is indicative of an amount of current being output by the stator 32 at the node 73. As shown in FIG. 2, the when the output signal from the current sensor is delivered to the regulator 48 it is passed through an amplifier 80. The amplifier 80 amplifies the signal from the current sensor 46 and sends the amplified signal to the microprocessor 98 of the regulator 48. The microprocessor 98 utilizes the amplified signal to determine the amount of current being output by the stator 32.

The voltage regulator 48 is provided to control an output voltage and an output current being output by the stator 32. The regulator 48 is housed entirely within the housing 17 of the alternator 16. FIG. 1 shows various inputs/outputs for the regulator 48. These inputs/outputs are designated as F+, P, B+, L, I, S and T. FIG. 1 also shows a ground connection for the regulator 48. The F+ output designates the regulator connection to the field coil 60. The P input designates the regulator connection to the stator windings. The B+ input designates the regulator connection to the battery 18. The L connection designates the regulator connection to the ignition switch 24. The I input designates the regulator connection to the current sensor 46, and this input provides an indication of the current flowing to or from the battery. The S input designates the external sense connection to the battery, and this input provides the correct voltage to the battery (i.e., eliminates resistance losses in the B+ to the battery line). The T input designates the regulator connection to the temperature sensor 50.

With particular reference to FIG. 2, the regulator 48 of the alternator 16 is shown, including various components, such as an internal microprocessor 98. It will be recognized that the microprocessor 98 and the various components of the regulator 48 may be provided together on a single chip/printed circuit board. Alternatively, the various components of the regulator 48 may be provided separately and wired to the microprocessor.

As shown in FIG. 2, the various components of the regulator 48 include amplifiers 80, 82, 84, 86, a power supply 88, a transistor 90, resistors 92, 94, 96, a microprocessor 98, and a memory device 99. The power supply 88 is configured to provide an operational voltage to the microprocessor 98. The power supply 88 is electrically coupled between the node 73 and a microprocessor 98. The amplifier 82 is provided to amplify a control signal from the microprocessor 98 for a controlling the transistor 90. As illustrated, the amplifier 82 represents circuitry required to drive the gate terminal of the transistor 90. A drain terminal of the transistor 90 is electrically coupled to the node 73. Further, a source terminal of the transistor 90 is electrically coupled to a node 102. A resistor 92 is electrically coupled between the node 102 and the node 100 which is electrically coupled to the field coil 60 of the rotor 30. During operation, the microprocessor 98 adjusts the control signal output to the amplifier 82 for controlling switching frequency of the transistor 90 to adjust a duty cycle of a signal applied to the field coil 60. Further, by adjusting the duty cycle of a signal applied to the field coil 60 to a desired duty cycle, an amount of current being output by the stator 32 is adjusted to a desired current level.

As further illustrated in FIG. 2, the resistor 94 is electrically coupled between the node 73 (at the B+ input) and a node 106. The resistor 96 is electrically coupled between the node 106 and electrical ground. In addition, the node 106 is electrically coupled to the microprocessor 98. The microprocessor 98 monitors a voltage at the node 106 to determine the output voltage of the stator 32.

The amplifier 84 has first and second input terminals electrically coupled to nodes 100, 102, respectively. Further, the amplifier 84 has an output terminal electrically coupled to the microprocessor 98. The microprocessor 98 monitors a voltage output by the amplifier 84 to determine a switching current received by the field coil 60 and to detect a short circuit fault condition of the field coil 60.

The amplifier 86 is electrically coupled between the node 70 and the microprocessor 98. The amplifier 86 amplifies a signal output at the stator node 70 that is received by the microprocessor 98. The microprocessor 98 is configured to determine a frequency of AC phase voltage of the stator 30 based on the amplified signal from the amplifier 86. Further, the microprocessor 98 is further configured to determine a value indicative of the rotational speed of the rotor 30 based on the frequency of the AC phase voltage of the stator 32.

The microprocessor 98 is provided to control operation of the voltage regulator 48, and in particular to control an amount of current being output by the alternator 16 and an amount of torque loading of the alternator 16 on the engine 14. The microprocessor 98 receives power form the power supply 88. The microprocessor 98 controls the output to the field coil 30 via amplifier 82 and the connected transistor 90. The microprocessor 98 monitors the output to the field coil 30 via the amplifier 84. At the same time, the microprocessor monitors the output of the stator windings 62, 64, 66 via amplifier 86. In addition, the microprocessor 98 receives inputs from the current sensor 46 via amplifier 80, the battery 18, the ignition switch 24, and the temperature sensor 50. Furthermore, a memory device 99 is connected to the microprocessor 98. The memory device 99 is configured to store computer executable instructions utilized by the microprocessor 98 and associated data for implementing methods that will be described in further detail below.

As shown in FIG. 1, the temperature sensor 50 is a remote sensor provided external to the alternator housing 17. The temperature sensor 50 is generally provided adjacent to the battery 18, and may be positioned upon the battery 18 or even inside the battery casing. By providing the temperature sensor 50 adjacent to the battery 18, a direct reading may be taken from the temperature sensor 50 to provide the temperature of the battery 18. The temperature sensor 50 is generally remote from the regulator 48 within the engine compartment since the regulator 48 is positioned within the alternator housing 17 and the temperature sensor 50 is positioned adjacent to the battery 18. However, the relatively low power signal from the temperature sensor 50 is easily delivered to the regulator 48 within the alternator 16 via a wire connection between the temperature sensor and the alternator. The temperature sensor 50 may be any temperature sensor appropriate for use in high temperature automotive applications. For example the temperature sensor may be a thermistor or a thermistor network.

Similar to the temperature sensor 50, other inputs remote from the alternator 16 are provide to the regulator 48. For example, the current sensor 46 provides an indication of current flowing to or from the battery. Also, when current flows through ignition lamp 26, the regulator is provided with an input indicating that the engine is being cranked. ECM 20 can also communicate with the regulator from a location remote from the alternator.

In addition to remote inputs, the regulator also includes several inputs that are internal to the alternator. For example, the regulator 48 receives signal input P indicating the output voltage of the alternator. Furthermore, before delivering current to the field coil at F+, the regulator 48 delivers information internally to the microprocessor 98 to indicate the duty cycle of the signal applied to the field coil (as discussed above with reference to FIG. 2) and the magnitude of the signal.

The regulator 48 receives the multiple inputs (e.g., inputs B+, L, I, S and T in FIG. 1) and processes the inputs to deliver current to the field coil at F+. The microcontroller 98 is configured to control the regulator output in order to charge various battery types in a precise and efficient manner. In particular, the microcontroller 98 is programmed to control the regulator output differently depending upon the type of battery IS used in association with the vehicle alternator 16. Accordingly, for the same inputs received by the regulator, the regulator might deliver a different current or duty cycle to the field coil for one battery type versus another battery type. It will be appreciated that a different battery "type" may refer to different battery brands, manufacturers, models, kinds, classes, etc. For example, an AGM (absorbent glass mat) battery is a different "type" of battery that a lithium ion battery. The AGM battery is also a particular type of lead acid battery that is different from the conventional type of lead acid battery used in automobiles or a carbon foam lead acid battery. Furthermore, two different models of AGM batteries made by the same manufacturer may be classified as different "types" of batteries. In at least one embodiment, the microcontroller 48 is programmed based on the type of battery system being used. Input 21 from the ECM may be used to accomplish such programming indicating the type of battery system being used.

The memory device 99 includes a plurality of different field current control programs that may be executed by the microprocessor 98. Each of the plurality of different programs is configured to provide an optimal field current through the field coil of the alternator, based at least in part on the type of battery used in the automotive vehicle. For example, if an AGM battery is used in the automobile, a first program may be used to control the field current. However, if a carbon foam lead acid battery is used in the automobile, a second program might be used to control the field current. Based on the type of battery used, different outputs from the charging system may be desirable. For example, with a first battery type, limiting the charge voltage to a maximum value above a certain temperature may be preferred to avoid damaging the battery. With a second battery type, the maximum or desired value of the charge voltage at the same temperature may be significantly different. Accordingly, by knowing the type of battery used in the automobile, the regulator 48 is equipped to control the alternator charging system and perform accurate, efficient and stable control of battery charging.

One skilled in the art will recognize that variations on the above-described embodiments may be easily achieved. For example, in one alternative embodiment, the memory device 99 does not include a plurality of different field current control programs associated with different battery types. Instead, the processor 98 is programmed with only a single field current control program that is based on the particular battery type that will be used in the automobile receiving that particular alternator Accordingly, in this embodiment, the processor 90 may be pre-programmed during manufacture of the alternator with one of a plurality of different field current control programs, wherein the selected program is based on the type of battery and/or vehicle that the alternator is designed for.

In at least one alternative embodiment, the vehicle 10 further includes an engine control module 20 (ECM). The engine control module 20 is provided to control operation of the engine 14. The engine control module 20 operably communicates with the engine 14 and the alternator 16 via a communication bus 21. The communication bus is utilized to send and receive data between the engine control module 20 and the alternator 16. When the ECM is used, various types of data that would otherwise be sent directly to the microprocessor 98 may first be routed through the ECM and then passed on to the microprocessor through the ECM connection. For example, if an ECM is used in the automobile, the temperature sensor may send a battery temperature signal directly to the ECM for processing. That battery temperature signal may then be passed on to the regulator in its original form or in a processed form, and the processor 98 uses the information from the ECM 20 to control the field current. In addition, data concerning the specific type of battery used by the automobile may be processed by the ECM 20 and then passed on to the controller in some processed (or unprocessed) form to assist the processor in controlling the field current to provide the optimal output from the alternator.

While the invention has been described with reference to exemplary embodiments, it will be understood by those skilled in the art that other implementations and adaptations are possible. For example, various changes may be made and equivalent elements may be substituted for elements thereof without departing from the scope of the invention. In addition, many modifications may be made to adapt a particular situation or material to the teachings of the invention without departing from the essential scope thereof. Also, there are advantages to individual advancements described herein that may be obtained without incorporating other aspects described herein. Therefore, it is intended that the invention not be limited to the particular embodiment disclosed for carrying out this invention, but that the invention will include all embodiments falling within the scope of the appended claims.

What is claimed is:
1. A vehicle alternator comprising:
a housing;
a rotor having a field coil positioned within the housing;
a stator positioned within the housing, the stator configured to provide an output voltage in response to rotation of the rotor; and
a voltage regulator positioned within the housing, the voltage regulator configured to receive a battery temperature signal and a battery current signal from outside of the alternator, the voltage regulator further configured to control the current provided to the field coil based at least in part on the received battery temperature signal and the received battery current signal.

2. The vehicle alternator of claim 1, the voltage regulator further configured to receive at least one additional signal selected from the group consisting of a battery voltage signal, and a regulator duty cycle signal.

3. The vehicle alternator of claim 1 wherein the voltage regulator includes a processor configured to deliver a control signal within the regulator, the control signal configured to control the current provided to the field coil.

4. The vehicle alternator of claim 3 wherein the alternator further comprises a memory device associated with the processor, the memory device including a plurality of different programs, each of the plurality of different programs configured to adjust the control signal based at least in part on the battery temperature signal.

5. The vehicle alternator of claim 4 wherein the alternator is configured to select one of the plurality of different programs based on a type of battery used in association with the vehicle alternator.

6. The vehicle alternator of claim 3 wherein the processor is configured to control the current provided to the field coil based at least in part on a type of battery used in association with the vehicle alternator.

7. The vehicle alternator of claim 1 wherein the voltage regulator is configured to receive the battery current signal from a current sensor positioned adjacent to a vehicle battery.

8. A method of controlling vehicle alternator comprising:
delivering a battery temperature signal from outside the vehicle alternator to a regulator positioned within a housing of the vehicle alternator;
delivering a battery current signal from outside the vehicle alternator to the regulator;
providing a current to a field coil; and
adjusting the current provided to the field coil based at least in part on the battery temperature signal and the battery current signal received by the regulator.

9. The vehicle alternator of claim 8 wherein the battery temperature signal is received from a remote temperature sensor positioned adjacent to a vehicle battery.

10. The vehicle alternator of claim 8 wherein the battery temperature signal is received from an engine control module which receives a signal from a remote temperature sensor positioned adjacent to a vehicle battery.

11. The method of claim 8 further comprising the step of delivering at least one additional signal to the regulator, the at least one additional signal comprising a battery voltage signal or a regulator duty cycle signal, and wherein the current provided to the field coil is based at least in part on the additional signal received by the regulator.

12. The method of claim 8 wherein the step of providing the current to the field coil comprises delivering a control signal from a processor within the regulator, the control signal configured to control the current provided to the field coil.

13. The method of claim 8 further comprising the step of using the processor to execute a program that controls the control signal based at least in part on the battery temperature signal, wherein the program executed by the processor is dependent upon a type of battery used in association with the vehicle alternator.

14. The method of claim 8 wherein the step of adjusting the current provided to the field coil is dependent at least in part on a type of battery used in association with the vehicle alternator.

15. The method of claim 8 wherein the regulator includes a processor, the method further comprising the step of executing a program configured to adjust the current provided to the field coil.

16. The method of claim 15 further comprising the step of selecting the program from one of a plurality of different programs based on a type of battery used in association with the vehicle alternator.

17. An electrical arrangement for a vehicle, the electrical arrangement comprising:
a vehicle battery;
a temperature sensor provided adjacent the vehicle battery, the temperature sensor configured to provide a battery temperature signal;
a current sensor configured to detect current through an electrical conductor connected to the vehicle battery and provide a battery current signal; and
an alternator configured to receive the battery temperature signal from the temperature sensor, the alternator comprising,
an alternator housing,
a rotor having a field coil positioned within the alternator housing,
a stator positioned within the alternator housing, the stator configured to provide an output voltage in response to rotation of the rotor; and
a voltage regulator positioned within the housing, the voltage regulator configured to receive the battery temperature signal and the battery current signal, the voltage regulator further configured to control the current provided to the field coil based at least in part on the received battery temperature signal and the received battery current signal.

18. The electrical arrangement of claim 17 wherein the voltage regulator includes a processor configured to deliver a control signal within the regulator, the control signal configured to control the current provided to the field coil.

19. The electrical arrangement of claim 18 wherein the processor is configured to control the current provided to the field coil based at least in part on a type of battery used in association with the vehicle alternator.

20. The electrical arrangement of claim 19 wherein the voltage regulator is configured to control the current provided to the field coil to a first non-zero amount based at least in part on a first combination of the received battery temperature signal and the received battery current signal, and wherein the voltage regulator is configured to control the current provided to the field coil to a second non-zero amount based at least in part on a second combination of the received battery temperature signal and the received battery current signal.

* * * * *